May 26, 1964 B. H. WALLACE 3,134,266
MOTION CONVERTING MECHANISM
Filed May 25, 1961 2 Sheets-Sheet 1

INVENTOR.
BERT H. WALLACE
BY
Arthur J. Plantamura
ATTORNEY.

May 26, 1964  B. H. WALLACE  3,134,266
MOTION CONVERTING MECHANISM
Filed May 25, 1961  2 Sheets-Sheet 2
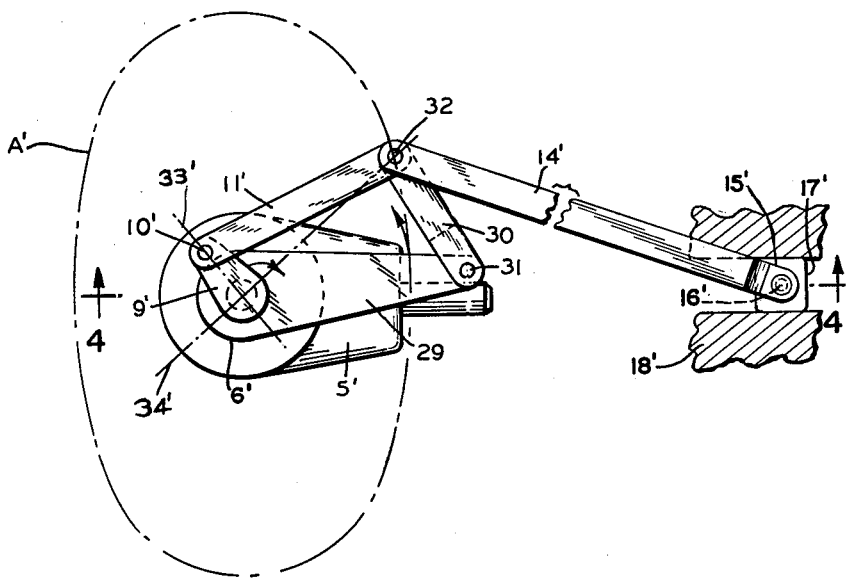
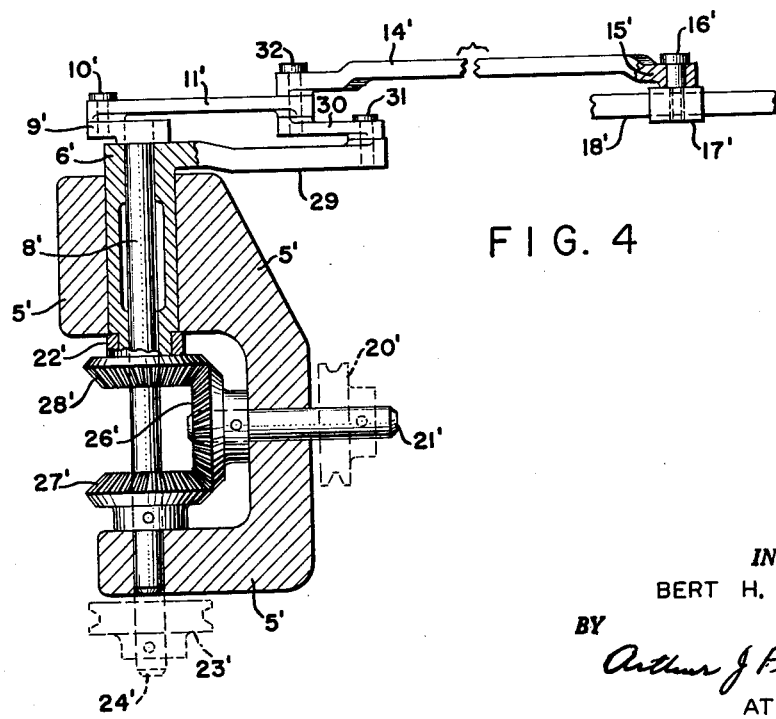
INVENTOR.
BERT H. WALLACE
BY Arthur J. Plantamura
ATTORNEY.

United States Patent Office 3,134,266
Patented May 26, 1964

3,134,266
MOTION CONVERTING MECHANISM
Bert H. Wallace, Uniondale, N.Y., assignor to American Machine & Foundry Company, a corporation of New Jersey
Filed May 25, 1961, Ser. No. 112,582
7 Claims. (Cl. 74—44)

This invention relates to a mechanism for converting rotary motion to reciprocating motion.

In conventional slide and crank mechanisms, a connecting link, of a length greater than that of the crank to which it is connected, is normally employed to convert rotary motion to reciprocating motion by means of a slider pivotally connected to the other end of the connecting link. The pivot end of the crank, attached to the connecting link, travels a circular path. In arrangements of this kind, where the axial center line of the slider passes through the drive shaft of the crank, 180° of the crank motion will pull the slider toward it, the other 180° of the crank motion will push the slider in the opposite direction; in this conventional usage, the points at which the slider direction reverses are, respectively, the 0° and 180° positions.

An analysis of the dynamics of the motion in the conventional mechanism demonstrates that at the 0° and 180° ranges there exists extremely high acceleration conditions which reduce the maximum speeds allowable for a given set of stress characteristics of the mechanism. For this reason, high speed machinery involving reciprocating motion has often resorted to cam actuation. This is because in using cams, a lower shock can be designed into the mechanism without sacrificing the desirability of higher speeds. However, cams are subject to appreciably more wear and, therefore, the dependability of the intended motion is affected. Moreover, these cams are often expensive in design as well as manufacture and, as a rule, require a retainer spring to insure continuous contact of the "cam follower" with the cam surface.

According to the invention, I have discovered a mechanism that avoids many of the drawbacks of the prior art. In the invention, a cycloid type motion with excellent, i.e. low acceleration characteristics, at the 0° and 180° range, forms the basis for the preferred mechanism. This cycloid type motion, when traced back to the path of the crank slider pivot, yields an oval orbital path rather than a circular path. By my arrangement, a considerable reduction in the speed of the slider about the two points of reversing directions, i.e. within the 0° and 180° ranges, is possible. Conversely, a considerable increase in the otherwise near constant velocity range about the 90° and 270° regions is attainable.

While the conventional slider-crank mechanism is based upon simple harmonic motion, and as such produces a sinusoidal type velocity curve with high acceleration peaks at the reversing points of the slider, and while cam-actuated reciprocating motion has some undesirable dynamic characteristics, this invention, on the other hand, produces a combination of cycloidal type motion in the conventional 0° and 180° regions and harmonic type motion in the conventional 90° and 270° regions, which keeps the maximal accelerations to a substantially lower finite value. As a consequence of this, considerably higher operating speeds for a given dynamic stress are possible.

It is an object of the invention to provide improved dynamic characteristics to the reciprocating motion of a mass.

It is a further object of the invention to provide improved means for converting rotary motion to reciprocating or sliding motion.

It is another object of the invention to smooth out the acceleration effects in the pivot points of cranks and connecting links in mechanisms of this type.

It is still another object of the invention to permit the use of higher rotary speeds in drives for mechanisms of this kind.

Other objects and advantages of the invention will be apparent from the description which follows, reference being made to the accompanying drawings, wherein:

FIG. 3 illustrates a diagrammatic plan view of an alternate arrangement of a mechanism in accordance with the invention.

FIG. 4 is an elevational view, partly in section, of the arrangement of FIG. 3, and is similar in arrangement, except for the crank arm linkage, to FIG. 2.

Figure 1:
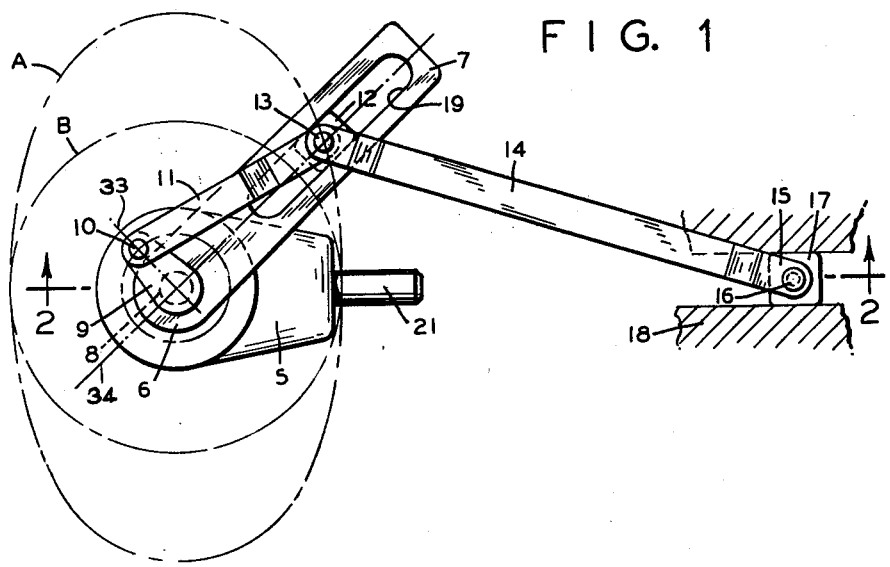
FIG. 1 illustrates a diagrammatic plan view of the preferred arrangement of the mechanism of the invention.
Figure 2:
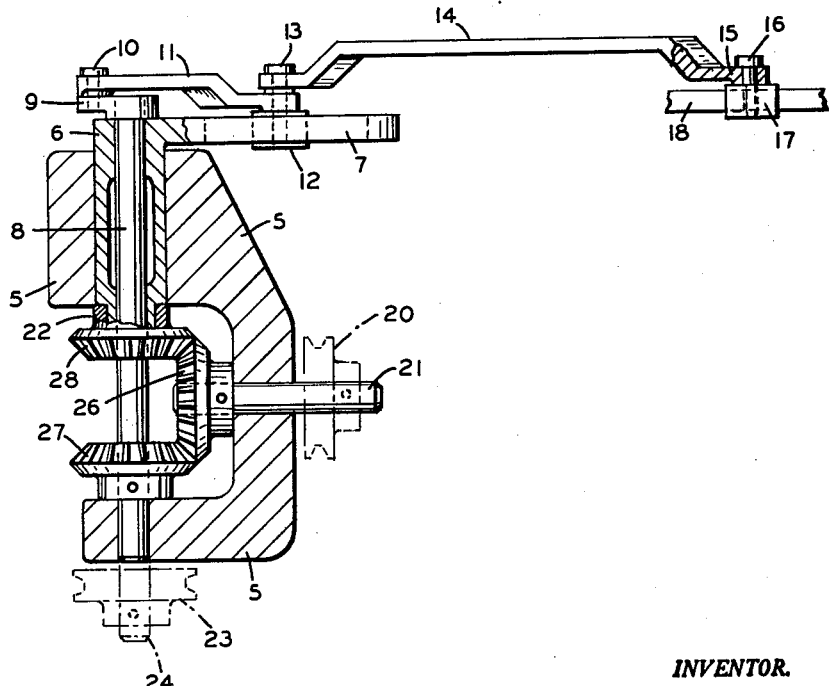
FIG. 2 is an elevational view, partly in section, of the arrangement of FIG. 1, modified so as to clearly illustrate the component parts.

According to the preferred embodiment of the invention and by reference to the FIGURES 1 and 2 of the drawing, it is seen that the improved reciprocal motion is accomplished by the introduction of a rotating slider-crank mechanism imparting a predetermined motion to the reciprocating element. When the crank and crank slider rotate at equal velocity but in opposite directions, they will be collinear with one another and with the first connecting link four times during each revolution, namely at the conventional 0°, 90°, 180° and 270° positions, and they will be collinear with one another, the first connecting link, and the slider motion of the reciprocating element twice during each revolution, namely at the conventional 0° and 180° positions.

Depending on the crank-connecting link ratio, this arrangement will yield reciprocating motion with substantially better acceleration characteristics than the equivalent conventional slider-crank mechanism, affording substantially higher speeds than their present counterparts without exceeding permissible maximum stresses.

Referring more in detail to the drawing, the arrangement comprising a base 5, supporting in rotatable relationship a hollow shaft 6 to which is attached or integrally formed a crank slider 7. Concentrically and rotatably contained in the crank slider 7 is a central shaft 8. Affixed to the shaft 8 or forming an integral part thereof is a crank 9. Attached to the crank 9 in pivoting relationship by means of the pivot pin 10 is a first connecting link 11. Crank slider 7 contains, in sliding relationship, the slider 12 suitably arranged in the slot 19 which is formed in the slider 7. One end of the connecting link 11 is attached to the crank 9 by a pivot pin 10. The other end of connecting link 11 is attached in pivotal relationship to the slider 12 by means of the pivot pin 13. Also attached to this end of the link 11 and to the slider 12 by means of the pivot pin 13 is one end of the second connecting link 14. The other end 15 of the connecting link 14 is connected, in pivoting arrangement, to the slider 17 by means of a pin 16. The slider 17 rides in a suitable track 18 of conventional arrangement. Slider 17 represents the mass or object of this reciprocating motion. The driving means for the shafts 6 and 8 may be effected by suitable conventional means. As shown, a drive through the pulley 20 connected to the drive means (not shown) may be used to drive the shaft 21. Alternately, a drive at the extension 24 of the shaft 8 through the pulley 23 connected a suitable drive means (not shown) may be used. In either drive arrangement, the opposing rotational direction of gears 27 and 28, and crank 7 and crank 9 will be apparent. The beveled gear 27 is keyed to or otherwise secured to the central shaft 8. The beveled gear 28 having the same number of teeth as 27 is secured by suitable means to the hollow shaft 6. It will be apparent that the beveled gear arrangement is shown by way of example only and that any arrangement known in the art may be employed to rotate the members 6 and 8 in opposite direction but at the same speeds.

Shown in FIG. 1 is the circular path B which would be formed by the crank and connecting link pivot of a conventional slider-crank mechanism. In accordance with the invention, point 13 generates an oval orbital path A.

It will be apparent that the path A, formed by the pivot point 13, may be modified by varying the lengths of the crank 9 and/or the connecting link 11.

An alternate embodiment of the invention is shown in FIG. 3 and FIG. 4. In this arrangement, the crank 9' is constructed and functions in a manner comparable to crank 9 in FIGS. 1 and 2 and member 29 is arranged for rotation comparable to crank slider 7 of FIGS. 1 and 2. As shown in FIG. 3, a connecting link 30 is pivotably mounted at one of its ends to a first connecting link 11' and to a second connecting link 14' thru pin 32 and at its other end to the crank 29 thru pin 31. All other elements shown in FIG. 3 and FIG. 4 and identified by primed numbers are substantially identical with, and perform the same function as those having unprimed reference numerals in FIGS. 1 and 2.

In accordance with the structure shown in FIG. 3, cranks 9' and 29 rotate at the same speed but in opposite direction to one another. The angular relation between cranks 9' and 29 is such, by arrangement, that crank 9' and center line 33, formed by the common center line of the mounting shafts of cranks 9' and 29 and the center of pin 32, form approximately equal angles with respect to the x- and y-axes of a conventional coordinate system.

By reference to FIG. 1, it is seen that in all positions, the angles formed by the center line 33 of the crank 9 and the center line 34 of the crank slider 7 will be substantially symmetrical with respect to the conventional x- and y-coordinate reference axes. In FIG. 3, the angles formed by the center lines 33' and 34' have a like relationship to the conventional x- and y-coordinate reference axes except for the periodic deviation caused by the curvilinear motion of pin 32 about pin 31 (effected through member 30) during rotation.

It is thus seen from the foregoing and as shown in the preferred embodiment illustrated in FIGS. 1 and 2, that, in essence, a slider crank arrangement when rotated as a whole by means of an additional connecting link, imparts smooth reciprocal motion to a sliding mass. Similarly, as shown in FIG. 3 and FIG. 4, a four bar linkage when rotated as a whole and in conjunction with an additional connecting link provides smooth reciprocal motion to a sliding mass. Also in lieu of the additional connecting link as described herein, a conventional scotch yoke means of imparting the reciprocal motion to a sliding mass may be employed in conjunction with the present invention. When so used, the scotch yoke would be actuated in sliding arrangement by the pin 13 of FIG. 1 and pin 32 of FIG. 3.

It will be apparent to those skilled in the art that various modifications may be made in the teaching presented without departing from the scope of the invention. Accordingly, the invention is not to be limited except insofar as necessitated by the appended claims.

I claim:

1. Means for translating rotary movement into reciprocating movement comprising in combination, a support, a hollow shaft rotatable on said support, a central shaft rotatably and concentrically positioned within said hollow shaft arranged for rotation at the same speed but opposite in direction to said hollow shaft, a first crank affixed to and rotating with said central shaft, a second crank affixed to and rotating with said hollow shaft, a linking member for transmitting reciprocating motion, a connecting link joining said first crank and said linking member, pivoting connecting means joining said second crank, and said connecting link and linking member at the juncture thereof, and means for rotating said shafts at the same speed but in opposite direction.

2. Means for translating rotary movement into reciprocating movement comprising in combination, a support, a hollow shaft rotatable on said support, a central shaft concentrically positioned within said hollow shaft arranged for rotation at the same speed but opposite in direction to said hollow shaft, a first crank affixed to and rotating with said central shaft, a second crank affixed to and rotating with said hollow shaft, a first connecting link pivoted at one of its ends on said first crank so that the connecting pivot point defines a rotary path, and connected at the other end to said second crank so as to generate at the point of connection with said second crank a closed orbital curve, a second connecting link pivoted at one of its ends to the pivot point of the second crank forming the orbital curve and at the other end to a slider for utilizing the motion, and means for rotating at the same velocity but in opposite direction said main shaft and said hollow shaft.

3. Means for translating rotary movement into reciprocating movement comprising in combination, a support, a hollow shaft rotatable on said support, a central shaft rotatably and concentrically positioned within said hollow shaft arranged for rotation at the same speed but opposite in direction to said hollow shaft, a crank affixed to and rotating with said central shaft, a crank slider affixed to and rotating with said hollow shaft, a first connecting link pivoted at one of its ends on said crank so that the connecting pivot point defines a rotary path and connected at the other end to said crank slider so as to generate at the point of connection with said slider a closed orbital curve, a second connecting link pivoted at one of its ends to the pivot point of the crank slider forming the orbital curve and at the other end to a slider for utilizing the motion, means for rotating at the same velocity but in opposite direction said main shaft and said hollow shaft, said crank and crank slider being synchronized so that as the first connecting link passes the center point of said rotatable shafts the pivot points at the extremes of said first connecting link form a straight line with said center point.

4. Means for translating rotary movement into reciprocating movement comprising in combination, a support, a hollow shaft rotatable on said support, a central shaft rotatably and concentrically positioned within said hollow shaft, a crank affixed to and rotating with said central shaft, a crank slider affixed to and rotating with said hollow shaft, a first connecting link pivoted at one of its ends on said crank so that the connecting pivot point defines a rotary path, and connected at the other end to said crank slider so as to generate at the point of connection with said slider a closed orbital curve, a second connecting link pivoted at one of its ends to the pivot point of the crank slider forming the orbital curve and at the other end to a slider, and means for rotating at the same velocity but in opposite direction said main shaft and said hollow shaft, said means comprising a bevel gear attached to each of said shafts and to a driving bevel gear.

5. Means for translating rotary movement into reciprocating movement comprising in combination, a support, a hollow shaft rotatable on said support, a central shaft concentrically positioned within said hollow shaft arranged for rotation at the same speed but opposite in direction to said hollow shaft, a first crank affixed to and rotating with said central shaft, a second crank affixed to and rotating with said hollow shaft, a first connecting link pivoted at one of its ends on said first crank so that the connecting pivot point defines a rotary path and connected at the other end through a linking member to said second crank so as to generate at the point of connection of said first connecting link and linking members a closed orbital curve, a second connecting link pivoted at one of its ends to the pivot point of the linking member and first connecting link which forms the orbital curve and, at the other end, to a slider for utilizing the motion, and means for rotating at the same velocity but in opposite direction said main shaft and said hollow shaft.

6. In an arrangement for translating rotary movement into reciprocating movement, the improvement in the rotary movement utilized for the production of the reciprocating movement which comprises a hollow shaft rotatable on a support, a central shaft rotatably and concentrically positioned with said hollow shaft, a first crank affixed to and rotating with said central shaft, a second crank affixed to and rotating with said hollow shaft, a slider linking member for transmitting reciprocating motion, a connecting link joining said first crank and said slider linking member, pivoting connecting means joining said second crank, and said connecting link at the juncture thereof with the slider linking member, and means for rotating said shafts at the same speed but in opposite direction.

7. Means for translating rotary movement into reciprocating movement comprising in combination, a support, a hollow shaft rotatable on said support, a central shaft concentrically positioned within said hollow shaft arranged for rotation at the same speed but opposite in direction to said hollow shaft, a first crank affixed to and rotating with said central shaft, a second crank affixed to and rotating with said hollow shaft, a connecting element pivoted at one of its ends on said first crank and connected at the other end to said second crank, a slider connecting link pivoted at its first end to said connecting element and at the other end to a slider for utilizing the reciprocating movement, said slider connecting link at its first end being pivoted at a point on said connecting element removed from said first crank and disposed so said removed pivot point defines a closed orbital path as said main shaft and hollow shaft rotate, and means for rotating at the same velocity but in opposite direction said main shaft and said hollow shaft.

References Cited in the file of this patent

UNITED STATES PATENTS

| 157,765 | Ruggles | Dec. 15, 1874 |
| 887,276 | Selley | May 12, 1908 |

FOREIGN PATENTS

| 13,336 | Great Britain | Aug. 24, 1889 |